United States Patent [19]

Wood

[11] Patent Number: 5,082,621
[45] Date of Patent: Jan. 21, 1992

[54] NEUTRON REFLECTING SUPERMIRROR STRUCTURE

[75] Inventor: James L. Wood, Drayton Plains, Mich.

[73] Assignee: Ovonic Synthetic Materials Company, Inc., Troy, Mich.

[21] Appl. No.: 566,909

[22] Filed: Jul. 31, 1990

[51] Int. Cl.$^5$ .............................................. G21C 11/06
[52] U.S. Cl. .................................... 376/458; 376/906; 428/635; 428/660
[58] Field of Search ............... 376/458, 459, 904, 906, 376/288, 340-345, 110, 202; 252/478; 428/635, 660, 680

[56] References Cited

U.S. PATENT DOCUMENTS

| | | | |
|---|---|---|---|
| 4,157,277 | 6/1979 | Marmonier et al. | 376/254 |
| 4,725,509 | 2/1988 | Ryan | 428/660 |
| 4,743,423 | 5/1988 | Turner et al. | 376/288 |
| 4,761,346 | 8/1988 | Naik | 428/660 |

OTHER PUBLICATIONS

"Nickel Mirror and Supermirror Neutron Guide Tubes at the Kyoto University Research Reactor", pp. 54-58, (1988).

"Recent Advances with Supermirror Polarisers" by Schrapf, pp. 182-189 (1982).

"The Use of Focusing Supermirror Neutron Guides to Enhance Cold Neutron Fluence Rates", (1988), pp. 181-190.

"Transmission Optical Device to Produce Intense Polarized Neutron Beams" Mook and Hayter, pp. 648-650, Aug. 1988.

"Neutron X-Ray Scattering and TEM Studies of Ni-Ti Multilayers", Keem et al., (1988).

*Primary Examiner*—Daniel D. Wasil
*Attorney, Agent, or Firm*—Marvin S. Siskind

[57] ABSTRACT

An improved neutron reflecting supermirror structure comprising a plurality of stacked sets of bilayers of neutron reflecting materials. The improved neutron reflecting supermirror structure is adapted to provide extremely good performance at high incidence angles, i.e. up to four time the critical angle of standard neutron mirror structures. The reflection of neutrons striking the supermirror structure at a high critical angle provides enhanced neutron throughput, and hence more efficient and economical use of neutron sources. One layer of each set of bilayers consist of titanium, and the second layer of each set of bilayers consist of an alloy of nickel with carbon interstitially present in the nickel alloy.

12 Claims, 1 Drawing Sheet

NEUTRON REFLECTING SUPERMIRROR STRUCTURE

STATEMENT REGARDING FEDERALLY SPONSORED RESEARCH

This invention was made with Goverment support under Contract No. DE-AC02-89ER80810 awarded by the United States Department of Energy.

FIELD OF THE INVENTION

The instant invention relates generally to the field of neutron reflective/scattering devices adapted to collect neutrons from a neutron source, such as a nuclear reactor core, and guide said neutrons to remote locations for use in, inter alia, testing and research facilities. The instant invention is more particularly related to the field of improved, neutron reflecting, multilayered supermirror structures characterized by average neutron reflectivities of greater than 97% at incident angles of at least two times the critical angle of standard neutron reflectors, such as nickel.

BACKGROUND OF THE INVENTION

Neutron scattering experimentation has been conducted both in the United States and throughout the world since the early 1950's. The fundamental breakthroughs in neutron research are the result of the expenditure of hundreds of millions of dollars in the development and construction of research and analytical facilities. Neutron research has found its greatest utility in applications such as elemental analysis, determination of atomic arrangement, the magnitude and direction of atomic magnetic moments, and the examination of macroscopic bodies for structural flaws. In fact, neutron experimentation/analysis is often the only source of essential analytical information, which is otherwise unattainable by other spectroscopic or diffraction techniques. Neutron research is also critical to the development of advanced synthetic materials for use in a host of "next generation" products and applications. The basic principles of neutron reflection are reported on in a paper by G. P. Felcher entitled "Principles of Neutron Reflection" SPIE Vol 983, Thin-Film Neutron Optical Devices (1988).

Several laboratories (including many of the United States national labs) have proposed improving the quality and quantity of neutron experimentation by channelling neutrons to remotely located experimental stations via neutron reflecting guidetubes. The advantages of this approach have been demonstrated by research facilities in Europe and Japan. Heretofore, the only method for collecting and transporting neutrons (particularly those neutrons having the most utility, and characterized by wavelengths of greater than about 0.4 nm, also known as "cold neutrons") was to employ guidetubes having 100 nm thick nickel plated glass plates disposed therein. Nickel has, until recently, been a preferred reflective element for use in neutron guidetubes due to the fact that nickel has the maximum reflection angle of any single element. In fact, nickel's maximum reflection angle is approximately equal to the critical reflection angle for a neutron wavelength of 0.4 nm (i.e., approximately 0.4 degrees theta). This critical angle is important since it defines the angular acceptance of the guidetube, and since the neutron flux from a guidetube is typically measured in "counts per minute" (as opposed to x-ray fluxes in excess of 1000 counts per second) enhanced guidetube acceptance is highly desirable.

Recently, much interest has been shown to the area of multilayered neutron reflecting supermirrors for improving neutron acceptance and throughput beyond that of pure Ni films. These supermirrors typically take the form of layered films of titanium and nickel having a distribution of bilayer thicknesses designed to yield overlapping Bragg diffraction peaks to occur from the region just above the cutoff angle characteristic of Ni to some increased angle of acceptance. It is also important that reflectivity of the supermirror remains high as the reflection angle is extended, otherwise the cumulative reduction from each reflection along the guidetube would result in an unacceptable loss of neutron flux. Heretofore, titanium and nickel have been the preferred choices for non-polarizing supermirrors owing to their high characteristic effective neutron scattering.

Experimental Ni-Ti supermirror guidetubes have found limited use in Japan and Europe as was demonstrated by Ebisawa, et al in a publication entitled "Nickel Mirror and Supermirror Neutron Guides at the Kyoto University Research Reactor" SPIE Proc., v. 983, pp 54–58, (1988); and Schoupf, "Recent Advances with supermirror Polarizers" AIP Proc., No. 89, pp 182–189 (1982). Other progress has been reported in a publication by Rossbach, et al entitled "The Use of Focusing Supermirror Neutron Guides to Enhance Cold Neutron Fluence Rates" Nuclear Instruments and Methods in Physics Research B 35 (1988) 181-190. Rossbach, et al report improved neutron reflecting characteristics in carefully deposited Ti-Ni supermirror structures on certain glass substrates having a measured roughness of 18.5 angstroms. These supermirror structures have been used in neutron reflecting applications requiring reflectivity lower than standard guidetubes: hence reflectivity is approximately 65%. Rossbach, et al indicates that layer imperfections resulting from crystal growth are the primary reason for less than optimum reflectivity.

While Ti-Ni supermirrors have to date proven effective for use in neutron reflecting applications, routineers skilled in the supermirror art have reported observing distortions in the layer structure. The result is a loss (often serious) in the reflectivity of the supermirror, and hence a significant increase in the effective cost of neutron experimentation. It is believed that the layer distortions are the result of, inter alia, crystal growth in the layers, materials interactions, film stresses of the layered structures and/or interdiffusion of Ti and Ni at the layer interfaces which prevent the attainment of the high degrees of layer flatness required in order to achieve the desired high reflectivity. In fact, the instant inventors have found that a lack of layer flatness is the primary cause for reduction in reflectivity.

Attempts to enhance supermirror performance so as to achieve neutron reflection of greater than three times the critical angle of nickel alone have been reported in a number of publications. Prior to the invention of the novel supermirror structures described hereinbelow, no supermirrors have achieved the performance levels needed for practical neutron guidetube applications. Numerous reasons for the poor performance of supermirrors have been advanced, as in, for example, a publication by Keem, et al entitled "Neutron, X-Ray Scattering and TEM Studies of Ni-Ti Multilayers" published in SPIE Vol. 983 Thin-Film Neutron Optical Devices (1988) which identifies cusp formation in the Ni-Ti bilayers as the principle factor preventing supermirror performance at acceptable levels.

Progress has, however, been reported in the development and fabrication of polarizing (i.e. supermirrors which more effectively reflect one polarization of neutron spin) supermirrors. Mook and Hayter report in "Transmission Optical Device to Produce Intense Polarized Neutron Beams" Appl. Phys. Lett. 53 (8), 22 August 1988, p. 648 a highly effective polarizing neutron mirror making use of a crystalline silicon layer for polarizing reflected neutrons. However, improvements in the field of polarizing neutron mirrors are only marginally applicable in the fabrication of non-polarizing supermirrors.

Accordingly, there exists a need for an improved neutron reflecting supermirror structure characterized by neutron reflectivities in excess of 97% and a critical angle of at least two times the critical angle of standard neutron reflectors such as nickel or Ti-Ni alloys. These improved supermirror structures will, of course, have to overcome the reflectivity problems resulting from a number of technical problems, including but not limited to, lack of layer flatness caused by, for example, crystal growth.

THE BRIEF SUMMARY OF THE INVENTION

There is disclosed herein an improved neutron reflecting supermirror structure comprising a plurality of stacked sets of bilayers of high and low neutron scattering materials. The high and low neutron scattering materials are deposited upon a substrate, wherein one layer of each of said sets of bilayers consists of titanium and the second layer of each of said sets of bilayers consists of an alloy including nickel and a microstructural enhancing element. The microstructure enhancing element may have a high neutron scattering potential, and be adapted to enhance the microstructure by reducing the crystal grain size of the nickel layer. In a first preferred embodiment of the instant invention the microstructure enhancing element is carbon and is present interstitially in the nickel alloy layer so as to modify the nickel crystal grain size. While not wishing to be bound by theory, it is believed that the microstructure enhancing element reduces the nickel crystal grain size, hence reducing layer stresses and promoting layer flatness. The percentage of carbon present in the nickel alloy layer is preferably between five and fifty percent and more preferably between twelve and thirty-five percent. In one embodiment of the instant invention, the nickel alloy layer has a nominal composition of $Ni_{72}C_{28}$ and in a second embodiment of the instant invention the nickel alloy layer has a nominal composition of $Ni_{86}C_{14}$. It is important to note, however, that the instant invention contemplates nickel alloy layers having nominal compositions of between $Ni_{95}C_5$ and $Ni_{50}C_{50}$.

The improved neutron reflecting supermirror structure described herein is typically deposited upon a substrate selected from group consisting of float glass, pyrex glass and silicon. As indicated hereinabove the improved neutron reflecting supermirror structure comprises a plurality of stacked sets of bilayers, the number of said bilayers being preferably between two and one thousand and most preferably between twenty and five hundred sets of stacked bilayers. It is to be noted that the thickness of each set of bilayers may be altered so that a layer or layers will be adapted to change the characteristic acceptance/reflection of the neutrons incident thereupon. Indeed, as will be discussed in greater detail hereinbelow, the thickness of each set of bilayers is graded in a continuous fashion to achieve the optimum in reflectivity and angular range. The layer thickness of each set of bilayers is between approximately two and four hundred nm and most preferably between eight and forty nm.

The improved neutron reflecting supermirror structure may further include a layer of nickel deposited either directly upon the substrate and immediately subjacent the first set of bilayers or atop the last or uppermost set of bilayers. Alternatively, the nickel may be substituted with a nickel alloy or carbon.

DETAILED DESCRIPTION OF THE INVENTION

The instant invention is an improved neutron reflecting supermirror which comprises a plurality of stacked sets of bilayers of high and low neutron scattering powered materials. The high and low neutron scattering power materials are deposited on a substrate, which substrate is typically selected from the group consisting of pyrex glass, boron containing glasses, float glass and silicon. One layer of each of said sets of bilayers consists of titanium and second layer of each set of said bilayers consists of an alloy including nickel and a microstructure enhancing element. In a first preferred embodiment the microstructure enhancing element has a high neutron scattering potential and is present interstitially in the nickel layer so as to reduce the nickel grain size. In a further preferred embodiment the microstructure enhancing element is carbon and is present in the nickel layer in concentrations between five and fifty percent and particularly in concentrations between twelve and thirty percent. The nickel alloy layer of each of said sets of bilayers typically has the nominal composition of $Ni_{86}C_{14}$ or $Ni_{72}C_{28}$.

As referred to hereinabove, the improved neutron reflecting supermirror comprises a number of stacked sets of bilayers, which sets of bilayers is typically numbered between two and one thousand and most preferably between twenty and five hundred. The thickness of each of said sets of bilayers is typically between five and two hundred nm. The improved neutron reflecting supermirror may further include a buffer layer disposed either between said substrate and the first of said sets of bilayers, or atop the uppermost layer of the top set of bilayers. The buffer layer is typically between 10 and 1500 nm thick and most preferably approximately one hundred nm. The buffer layer is typically a layer of nickel or nickel carbon alloy disposed to a thickness of approximately one hundred nm. The improved neutron reflecting supermirror may further include an intermediate layer disposed between between each of said alternating layers of titanium and nickel carbon alloy. In a preferred embodiment the intermediate layer is a layer of carbon deposited to a thickness of between two and five hundred nms.

Figure 1:
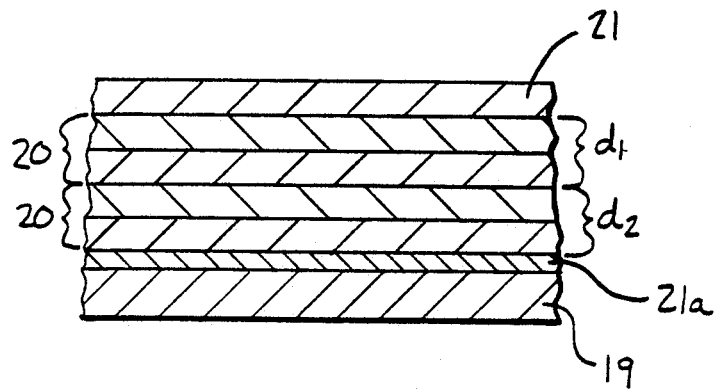
FIG. 1 is an exploded partial sectional view of one embodiment of the neutron reflecting supermirror structure of the instant invention.

Referring now to FIG. 1, there is illustrated therein the improved neutron reflecting supermirror structure of the present invention. The supermirror structure 18 is constructed as a plurality of stacked sets of bilayers 20, only two of which are illustrated, but which typically would be between two and one thousand sets. Each of the layer sets 20 is formed from at least two units $U_1$ and $U_2$. Each of the layer sets have respective d spacings of $d_1$ and $d_2$, which may or may not be equal to one another.

One of the units $U_1$ and $U_2$ includes at least one layer of material which has a relatively high neutron scattering power or potential and the other of said units of $U_1$ and $U_2$ includes at least a layer of material with relatively low neutron scattering potential material. In a preferred embodiment, $U_1$ is a relatively low neutron reflecting material such as titanium disposed atop a multilayer of relatively high neutron scattering potential material such as a layer nickel. It is the essence of the invention that the relatively high neutron scattering power layer include a microstructure enhancing element also having a high neutron scattering potential. In the preferred embodiment the microstructure enhancing element is carbon and is present interstitially in the nickel crystal grain in concentrations between five and fifty percent. In one embodiment, the nominal composition of the high neutron scattering potential layer, $U_2$ is $Ni_{72}C_{28}$. In a second embodiment of the instant invention the nominal composition of the layer $U_2$ is $Ni_{86}C_{14}$. It is however to be understood that the instant invention contemplates high neutron scattering potential layers having carbon present in concentrations from 5% to 50%, i.e., $Ni_{95}C_5$ through $Ni_{50}C_{50}$.

While not wishing to be bound by theory, the instant inventors have hypothesized that layers of pure Ni alone a insufficiently dense: i.e., too many voids exist in the Ni crystalline lattice. The result is the buckling, cusping, and layer distortion reported by earlier researchers. Conversely, it is believed that the microstructure enhancing material, carbon, may be serving as a catalyst to prevent the buckling and cusping by occupying otherwise vacant parts of the Ni lattice. The result is a smoother, flatter Nickel alloy layer free from the cusping and layer distortions found in previous Ni-Ti supermirrors, and hence better able to reflect neutrons incident thereupon.

The neutron reflecting supermirror structure of the instant invention is disposed atop the substrate 19 and may further include a buffer layer 21a. The buffer layer 21a may be disposed either upon said substrate 19 and below the first set of bilayers 20, or as is illustrated in FIG. 1, the buffer layer 21 may be disposed upon the top or uppermost of said sets of bilayers 20. Alternatively the neutron reflecting supermirror may include said buffer layer disposed as both the uppermost and lowermost layers. The buffer layer 21 and 21a is typically between one and one thousand nm thick and preferably approximately one hundred nm thick. The buffer layer 21 and 21a is typically formed as a layer of nickel, a nickel carbon alloy or carbon deposited upon said substrate and providing a base upon which to subsequently deposit said plurality of sets of bilayers, or upon the uppermost set of bilayers.

The neutron reflecting supermirror of FIG. 1 further possess a neutron dispersion pattern which can be altered to reflect incident neutrons from desired angles. Specifically, an incident beam of cold neutrons is made up of neutrons of a single wavelength (lambda) of 4 angstroms. The reflected beam is hence made up of a single wavelength of 4 angstroms reflected at an angle theta approximately according to Bragg's Law:

$$n\ lambda = 2d\ sine\ theta$$

wherein n=1 (for consideration of 1st order reflections); lambda=4 angstroms, the wavelength of cold neutrons; and 2d=the period or thickness of a given set of bilayers Since the value of n lambda remains constant it is thus possible to alter the reflected angle theta by varying the value for 2d. Algorithms for fabricating basic layered supermirror structures are disclosed in, for example, Majkrzck, et al, MRS Proc., "Fe-W Supermirrors for Polarizing Neutrons", 103, 115-120 (1988); and Hayter and Mook, J. Appl. Cryst., "Discrete Thin-Film Multilayer Design for X-Ray and Neutron Supermirrors", 22, 35-41 (1989) the disclosure of which is incorporated herein by reference. The result of employing a known algorithm is a distribution of bilayer (2d) thicknesses that cause overlapping Bragg diffraction peaks to occur from the region just above the Nickel cutoff angle to some increased angle of acceptance. It is of course critical that reflectivity remain near 100% as the reflection angle is extended, since otherwise the cumulative reduction from each reflection along the guidetube would result in an unacceptable loss of neutron flux.

Figure 2:
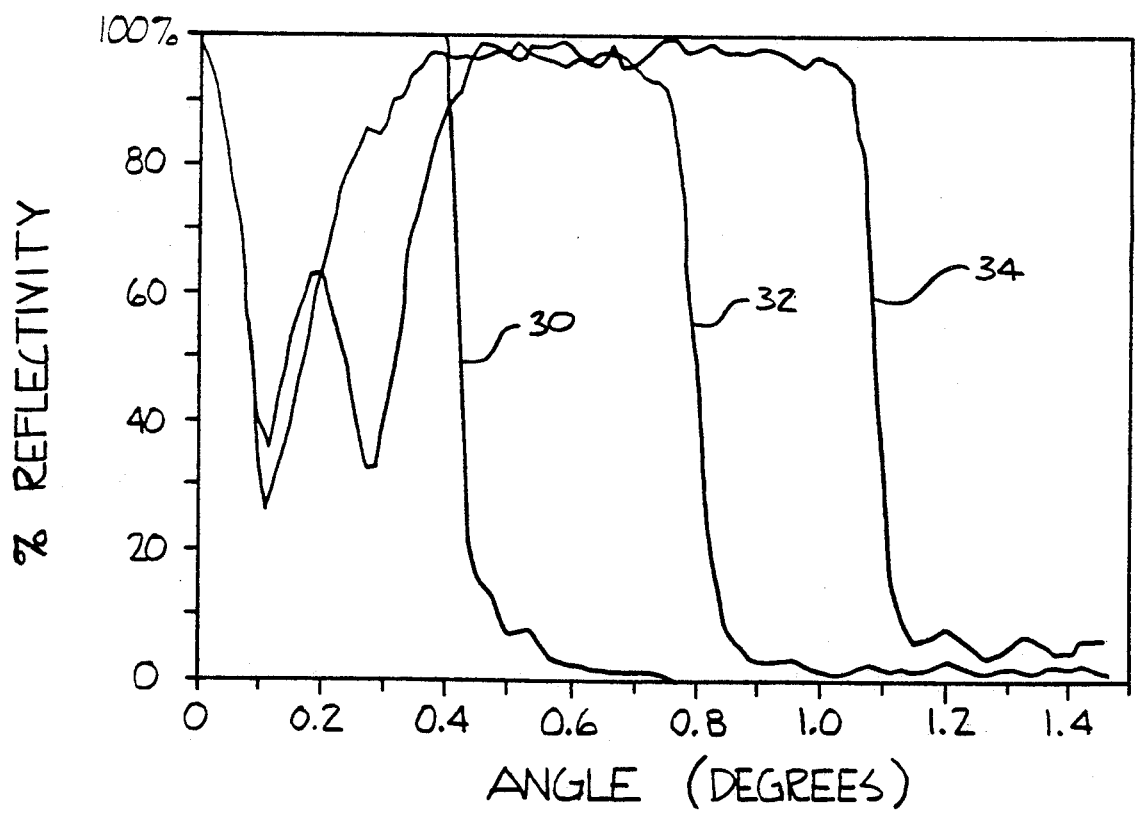
FIG. 2 is a reflectivity plot wherein reflectivity is plotted on the ordinate and angle in degrees plotted on the abscissa and wherein the reflectivity of a standard nickel coating is compared versus a $Ni_{72}C_{28}$/titanium supermirror.

It is this point which the inventive neutron reflecting supermirror addresses. More specifically and referring now to FIG. 2, there is illustrated therein a plot of reflectivity versus angle for a standard Nickel coating and the improved neutron reflecting supermirror. A perusal of FIG. 2 illustrates that the reflectivity of the best standard nickel coating, illustrated by Curve 30, is extremely good, i.e., approximately 100% up to the critical angle of nickel, approximately 0.4 degrees theta. However, as the critical angle increases, the reflectivity of the nickel coating falls off drastically; down to 0% reflectivity before 2× the critical angle of nickel, (approx. 0.8 degrees theta) and certainly to less than 10% by 0.5 degrees theta. Conversely, Ti:Ni-C alloy supermirrors as illustrated in FIG. 1 demonstrate excellent neutron reflectivity, i.e. greater than 95% at critical angles of up to 3× the critical angle of nickel alone. More specifically, Curves 32 and 34 illustrate a Ti:$Ni_{72}C_{28}$ alloy in two different layering algorithm structures. The structure illustrated in Curve 32 demonstrates reflection of approximately 95% out to two times the critical angle of the best standard Ni coating. The structure of Curve 34 demonstrates even better performance, having reflection of approximately 97% out to three times the critical angle of the best standard Ni coating.

In order to better understand the structure of the neutron reflecting supermirror structures of the instant invention, the following examples are presented as illustrative of the method of fabricating the same.

EXAMPLE

The inventive neutron reflecting supermirror structure of the instant invention was fabricated with a Ti/-$Ni_{72}C_{28}$ coating deposited on 5 cm×10 cm float glass. The glass substrate was cut to size from a 4 in ×4 in piece of float glass. Prior to deposition of the neutron reflecting supermirror structure upon the float glass, said substrate was cleaned by first hand washing said substrate in a CDC degreaser, which is thereafter thoroughly rinsed off in de-ionized water. Thereafter the substrate was immersed in a de-ionized water ultrasonic bath for one half hour and was then rinsed with methanol and blown dry with nitrogen.

The substrate is then loaded into an ion beam chamber and mounted on the substrate spinning rotation stage. The chamber was a horizontal cylinder with two 5" round by a ¼" thick target materials screwed onto opposite sides of a water cooled stainless steel block. The target block centered in the chamber and fixed to a horizontal shaft pointing inwards radially to the cylinder. The targets were positioned at a 45% angle to the horizontal and rotate 180° at specified intervals. The ion beam source was a 5 cm Hollow Cathode Source fixed to the end of the cylinder. An ion beam of Ar+ ions from the source was propelled towards the target block along the axis of the cylindrical chamber. Between the source and the target block was a Hollow Cathode Neutralizer which is aimed at a perpendicular to the beam of ions, intersecting with the beam roughly 3" from the source. The Hollow Cathode Neutralizer neutralizes the argon ions, which keeps the beam from spreading out from charge repulsion. Atoms strike the target materials, causing atoms of the target materials to be ejected. The sputtered atoms leave the target in all directions, with the highest percentage leaving at a perpendicular to the target. The substrates to be coated were approximately seven inches from the target. Also at a 45° angle, the substrate was parallel to the target and rotated slowly in order to insure the uniformity of the coating. The substrate assembly attached to the end of the chamber, just above the 5 cm source. The 5 cm source parameters are: 1500 V beam, 180 V Accelerator, and 50 mA beam current.

The system was pumped down to 1.0E-6 torr with a cryogenic pump. Argon gas was introduced into the chamber through a hollow cathode at a rate of 4.0 sccms/sec, bringing the chamber pressure to 2.0E-4 torr. A Ni-alloy target was constructed by covering 30% of a carbon target with four inward pointing triangles of nickel foil. The foil was tied to the target with nickel wire. The other target sputtered was simply solid titanium. After the beam sputters a target for a set length of time, the beam shuts off, the target block rotates 180° and exposes the other target, then the beam starts back up again. The timers were connected to magnetic proximity switches, which stopped the target every 180° and told the stepper motor when to turn the target block. This process is repeated over and over, resulting in a stack of layers of alternating materials on the substrate. One layer of material 1 (e.g. NiC), together with one layer of material 2 (Ti), constitutes a d-spacing. Calibration runs were performed in order to relate the time a target si sputtered to resultant thicknesses of that material on the substrate. The sputtering times for the various d-spacings required for a supermirror were interpolated from a graph of sputter time vs layer thickness for the two materials with a straight line connecting the two data points. Following all depositions, the substrates and system are allowed to cool in a vacuum with a background pressure of argon gas. As the layer structure of the supermirror is multiple graded, i.e., the d-spacing of each of said sets of bilayers is different, the deposition time of the titanium and nickel carbon alloy for each bilayer set will vary. The grading herein and the pattern for setting down the graded layers is established by a layer algorithm of the type disclosed hereinabove in, for example, the Hayter and Mook reference.

While the invention has been described in connection with preferred embodiments and procedures be understood that it is not intended to limit the invention to the described embodiments and procedures. On the contrary it is intended to cover all alternatives, modifications and equivalents which may be included within the sphere and scope of the invention as defined by the claims appended herein after.

We claim:

1. An improved neutron reflecting supermirror comprising a plurality of stacked sets of bilayers of high and low neutron scattering materials, said materials deposited upon a substrate, one layer of each of said sets of bilayers consisting of titanium and the second layer of each of said sets of bilayers consisting of an alloy including nickel and a microstructure enhancing element, carbon, interstitially present in the nickel alloy layer to modify the nickel crystal, wherein the microstructure enhancing element has a high neutron scattering potential.

2. A neutron reflecting supermirror as recited in claim 1, wherein the percentage of carbon present in the nickel alloy layer is between 5 and 50 percent.

3. A neutron reflecting supermirror as recited in claim 2, wherein the percentage of carbon present in the nickel alloy layer is between 12 and 30 percent.

4. A neutron reflecting supermirror as in claim 3, wherein the nickel alloy layer of said sets of bilayers has the nominal composition $Ni_{86}C_{14}$.

5. A neutron reflecting supermirror as in claim 3, wherein the nickel alloy layer of said sets of bilayers has the nominal composition $Ni_{71}C_{28}$.

6. A neutron reflecting supermirror as in claim 1, wherein the substrate is selected from the group consisting of float glass, pyrex glass, silicon, and other boron containing glasses.

7. A neutron reflecting supermirror as in claim 1, wherein the number of stacked sets of bilayers is between 2 and 1000.

8. A neutron reflecting supermirror as in claim 7, wherein the number of stacked sets of bilayers is between 5 and 500.

9. A neutron reflecting supermirror as in claim 1, wherein the thickness of each set of bilayers is between 2 and 400 nm.

10. A neutron reflecting supermirror as in claim 9, wherein the thickness of each set of bilayers is varied with respect to other sets of bilayers.

11. A neutron reflecting supermirror as in claim 1, further including a layer of material deposited between the substrate and the first of said sets of bilayers, said deposited layer fabricated from material selected from the the group consisting of nickel, nickel alloy, carbon and combinations thereof.

12. A neutron reflecting supermirror as in claim 1, further including a layer of nickel deposited atop the uppermost set of bilayers, said deposited layer fabricated from material selected from the group consisting of nickel, nickel alloy, carbon, and combinations thereof.

* * * * *